US012594929B2

(12) United States Patent
Choi et al.

(10) Patent No.: US 12,594,929 B2
(45) Date of Patent: Apr. 7, 2026

(54) APPARATUS AND METHOD FOR CONTROLLING HYBRID ELECTRIC VEHICLE

(71) Applicants: HYUNDAI MOTOR COMPANY, Seoul (KR); KIA CORPORATION, Seoul (KR)

(72) Inventors: Jung Yong Choi, Pohang-si (KR); Jae Hyoung Jeong, Seoul (KR); Hyung Min Kim, Ansan-si (KR); Hyeok Jun Kwon, Seoul (KR); Sang Won Lee, Hwaseong-si (KR); Yeon Bok Kim, Seongnam-si (KR); Jung Suk Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 199 days.

(21) Appl. No.: 18/410,245

(22) Filed: Jan. 11, 2024

(65) Prior Publication Data

US 2025/0136084 A1 May 1, 2025

(30) Foreign Application Priority Data

Oct. 30, 2023 (KR) ........................ 10-2023-0146234

(51) Int. Cl.
  *B60W 20/40* (2016.01)
  *B60W 10/02* (2006.01)
  *B60W 10/08* (2006.01)

(52) U.S. Cl.
  CPC ............ *B60W 20/40* (2013.01); *B60W 10/02* (2013.01); *B60W 10/08* (2013.01); *B60W 2520/10* (2013.01); *B60W 2710/021* (2013.01)

(58) Field of Classification Search
  CPC ...... B60W 20/40; B60W 10/02; B60W 10/08; B60W 2520/10; B60W 2710/021;
  (Continued)

(56) References Cited

U.S. PATENT DOCUMENTS 9,738,270 B1 * 8/2017 Chung .................... B60K 6/38
2013/0020169 A1 1/2013 Eich et al.
(Continued)

FOREIGN PATENT DOCUMENTS

CN 103381815 A 11/2013
CN 105189231 B 2/2018
(Continued)

*Primary Examiner* — Mary Cheung
(74) *Attorney, Agent, or Firm* — MCDONNELL BOEHNEN HULBERT & BERGHOFF LLP

(57) ABSTRACT

A method of controlling a hybrid electric vehicle includes checking a vehicle driving state and determining whether to satisfy a predetermined engine clutch engagement prohibition condition, by a controller, generating and outputting a control command for prohibiting engine clutch engagement and maintaining an engine clutch in an open state, by the controller, when it is determined that the predetermined engine clutch engagement prohibition condition is satisfied from the vehicle driving state, and controlling to maintain the engine clutch in the open state that is a power cut-off state, by the control command output from the controller.

10 Claims, 6 Drawing Sheets

(58) Field of Classification Search
CPC ......... B60W 2540/10; B60W 2540/12; B60W
30/18063; B60W 2510/0208; B60W
2510/18; B60W 2710/02; B60W 10/023;
B60K 6/387; B60K 6/442; B60Y
2200/92; B60Y 2300/18058; Y02T 10/62
See application file for complete search history.

(56) References Cited

U.S. PATENT DOCUMENTS

| | | | |
|---|---|---|---|
| 2014/0297073 A1* | 10/2014 | Jeong .................... | B60W 20/40 |
| | | | 903/902 |
| 2016/0031437 A1* | 2/2016 | Bang ........................ | B60K 6/48 |
| | | | 903/902 |
| 2016/0167666 A1* | 6/2016 | Oohata ................... | F16D 48/06 |
| | | | 477/166 |
| 2016/0272193 A1* | 9/2016 | Kim ........................ | B60K 6/442 |
| 2018/0099659 A1* | 4/2018 | Jeong .................... | B60W 20/15 |
| 2021/0164528 A1* | 6/2021 | Lee .................... | B60W 40/1005 |

FOREIGN PATENT DOCUMENTS

| | | | | | |
|---|---|---|---|---|---|
| JP | 2009-222190 A | | 10/2009 | | |
| JP | 2021098423 A | * | 7/2021 | ........ | B60W 30/1884 |
| KR | 10-1583102 B1 | | 1/2016 | | |
| KR | 10-2456071 B1 | | 10/2022 | | |
| KR | 10-2542798 B1 | | 6/2023 | | |

* cited by examiner

-- Prior Art --

Electrical Path

Mechanical Path

-- Prior Art --

-- Prior Art --

APPARATUS AND METHOD FOR CONTROLLING HYBRID ELECTRIC VEHICLE

CROSS REFERENCE TO RELATED APPLICATIONS

The present application claims priority to Korean Patent Application No. 10-2023-0146234, filed Oct. 30, 2023, the entire contents of which are incorporated herein for all purposes by this reference.

BACKGROUND

Technical Field

The present disclosure relates to an apparatus and method for controlling a hybrid electric vehicle that can solve the problem of unintended engine clutch engagement due to software or hardware errors.

Description of the Related Art

A hybrid electric vehicle is a vehicle that is driven using an engine (internal combustion engine) and a motor as a power source. As one of power train types of the hybrid electric vehicle, a Transmission Mounted Electric Device (TMED)-type hybrid system is known.

FIG. 1 is a diagram illustrating the configuration of a power train of a TMED hybrid electric vehicle. In the TMED-type hybrid system, an engine 1 and a motor 3, which are driving devices for driving the vehicle, are arranged in series, and a transmission 4 is connected to an output side of the motor 3 to shift the power of the engine and motor and then transmit the power to a driving shaft of the vehicle.

An engine clutch 2 is disposed between the engine 1 and the motor 3 to selectively control power between the engine and the motor. The engine clutch 2 selectively connects or disconnects power between the engine 1 and the motor 3 through closing (engaging) or opening (releasing) operation. The engine clutch 2 is engaged or disengaged (released) by controlling the operation of an actuator unit in response to a control command output from a controller.

Further, an inverter 5 for driving and controlling the motor 3 is mounted on the vehicle, and the motor 3 is connected to a high-voltage main battery 6 in the vehicle through the inverter 5 to enable charging and discharging. When the motor is driven, the inverter 5 converts a DC current supplied from the battery 6 into an AC current and then applies it to the motor 3 through a power cable. During motor regeneration, the inverter converts AC current generated by the motor into DC current and then supplies it to the battery 6.

Further, a starter generator, which is a motor that is connected to the engine 1 to transmit power and thereby starts the engine or generates power using rotating force transmitted from the engine, i.e. a Hybrid Starter and Generator 7 (hereinafter abbreviated as "HSG") is provided in the vehicle. Similarly to the motor 3 for driving the vehicle, the HSG 7 may also serve as both the motor and the generator, and is connected to the battery 6 through the inverter 5 to enable charging and discharging.

In the hybrid electric vehicle having the above configuration, a travel mode (i.e. Powertrain (PT) driving mode) is selected depending on operating conditions. The vehicle runs in an Electric Vehicle (EV) mode that is a pure electric vehicle mode using only the power of the motor 3, or runs in a Hybrid Electric Vehicle (HEV) mode that uses both the power of the engine 1 and the power of the motor 3.

In the hybrid electric vehicle, a regenerative mode is performed in which the vehicle's kinetic energy is recovered as electrical energy through motor power generation during braking or coasting due to inertia to charge the battery. The hybrid electric vehicle essentially requires the function of the regenerative mode so as to increase the efficiency of the vehicle and improve fuel efficiency.

Further, the hybrid electric vehicle requires proper power distribution between the engine 1 and the motor 3 so as to minimize fuel consumption and improve the fuel efficiency of the vehicle. The process of determining a target operating point and generating an engine torque command and a motor torque command in the TMED hybrid electric vehicle is as follows.

FIG. 2 is a block diagram illustrating the configuration of a control apparatus that performs power control and transmission control in the hybrid electric vehicle. As shown in the drawing, in the hybrid electric vehicle, a plurality of controllers 10 to 40 performs cooperative control for the power control and the transmission control of the vehicle.

An upper controller 10 of the hybrid electric vehicle, such as a hybrid controller (HCU) or a vehicle domain controller (VDCU), determines a driver demand torque according to a driver's driving intention on the basis of vehicle driving information such as a driver's accelerator pedal input value (APS value) and a brake pedal input value (BPS value).

Among a driver's driving input values (pedal input values), the accelerator pedal input value may be detected by an accelerator position sensor (APS), and the brake pedal input value may be detected by a brake pedal position sensor (BPS).

Further, the upper controller (HCU or VDCU) 10 determines whether to drive in an EV mode in which the engine clutch 2 is open or whether to drive in an HEV mode in which the engine clutch 2 is closed considering the driver demand torque and the state of charge (SOC) of the main battery 6 (travel-mode determination).

At this time, the upper controller 10 determines engine on and off, and torque distribution to the engine 1 and the motor 3, which are the driving devices, is performed on the basis of the determined driver demand torque and engine on/off information.

In a torque distribution process, the upper controller 10 determines engine torque and motor torque to satisfy the driver demand torque according to the distribution ratio and distribution torque profile for power distribution, and then generates and output a torque command for each power source.

Thus, an engine controller (ECU) 20 and a motor controller (MCU) 30 receive the engine torque command and the motor torque command from the hybrid controller 10, and control the torque of the engine 1 and the motor 3 according to each received torque command.

The transmission control is performed along with the power control of the vehicle. The transmission controller (TCU) 40 determines a target shift stage on the basis of information collected from the vehicle, and controls the operation of the transmission 4 to perform shifting to the target shift stage.

Further, the transmission controller 40 provides current shift state information such as a target shift stage, a shift class, and a shift phase, to the hybrid controller 10, and the hybrid controller 10 performs torque intervention control or the like with reference to shift state information.

In the TMED-type hybrid system, in the case of the EV mode, the motor torque is used as power to drive the vehicle with the engine clutch 2 disengaged. In the case of the HEV mode, the vehicle is driven using composite power obtained by adding the torque of the engine 1, the motor 3, and the HSG 7 with the engine clutch 2 engaged.

FIG. 3 is a flowchart showing the control process of a hybrid electric vehicle according to the related art. The problems of the related art will be described below with reference to FIG. 3.

As shown in the drawing, when the driver demand torque is determined on the basis of the vehicle driving information (S1), the travel mode (PT driving mode) of the vehicle is determined on the basis of the determined driver demand torque and battery SOC information (S2).

Further, the operation of the engine clutch 2 is controlled according to the determined travel mode. When the travel mode is the EV mode, the engagement of the engine clutch 2 is unnecessary, so the engine clutch is disengaged (released) (S3, S6), and then the vehicle is driven using the motor 3 as the power source (S7). On the other hand, when the travel mode is the HEV mode, the vehicle is driven (S5) with the composite power of the engine 1, the motor 3, and the HSG 7 with the engine clutch 2 engaged (S3, S4).

However, in a basic control logic for determining the torque of each power source (engine, motor, HSG) and generating a command, if the engine clutch 2 is unexpectedly engaged due to the error of software (SW) or hardware (HW) while driving using only the motor torque as power with the engine 1 being on and the engine clutch 2 being open, a situation may arise where the engine torque and the HSG torque are momentarily added to the motor torque.

Nevertheless, conventionally, there was no protection logic that monitors the state of the engine clutch so as to protect the vehicle and the driver from risks that may occur in the situation where the error occurs as described above.

SUMMARY

Accordingly, the present disclosure has been made keeping in mind the above problems occurring in the related art, and an objective of the present disclosure is to provide an apparatus and method for controlling a hybrid electric vehicle, which prohibits engine clutch engagement when the vehicle creeps with a motor while an engine is on and the engine clutch is open, thus preemptively preventing the engine clutch engagement due to software or hardware errors, and which prevents a dangerous situation from occurring due to errors as in the related art, thus improving vehicle stability.

The objectives of the present disclosure are not limited to the above-mentioned objective, and other objectives which are not mentioned will be clearly understood by those skilled in the art from the following description.

In order to accomplish the above objective, the present disclosure provides a method of controlling a hybrid electric vehicle, the method including checking a vehicle driving state and determining whether to satisfy a predetermined engine clutch engagement prohibition condition, by a controller, generating and outputting a control command for prohibiting engine clutch engagement and maintaining an engine clutch in an open state, by the controller, when it is determined that the predetermined engine clutch engagement prohibition condition is satisfied from the vehicle driving state, and controlling to maintain the engine clutch in the open state that is a power cut-off state, by the control command output from the controller.

The vehicle driving state may include an engine clutch state, a vehicle travel state, and an engine state.

The engine clutch engagement prohibition condition, as a condition for the vehicle driving state, may include a condition in which the engine clutch is in the open state, a condition in which the vehicle creeps with a motor, and a condition in which an engine is on, that is, the engine is operating.

The controller may determine that the engine clutch engagement prohibition condition is not satisfied, when a brake is on, that is, the vehicle brake is operating, as the vehicle driving state.

The controller may generate and output a control command to prohibit the engine clutch engagement and maintain the engine clutch in the open state, in the case that it is determined that the engine clutch engagement prohibition condition is satisfied when the control command for the engine clutch engagement is generated, in the generating and outputting the control command for maintaining the engine clutch in the open state.

The method may further include determining whether the engine clutch engagement is necessary from the determined travel mode of the vehicle, when a driver demand torque is determined and the travel mode of the vehicle is determined, by the controller, generating and outputting the control command to engage the engine clutch, by the controller, when it is determined that the engine clutch engagement is necessary, and controlling the engine clutch to be in a closed state, that is, in a power connection state by the control command for the engine clutch engagement output from the controller.

The present disclosure provides an apparatus of controlling a hybrid electric vehicle, the apparatus including a driving information detection part detecting vehicle driving information, and a controller performing engine clutch engagement prohibition control logic, wherein the controller checks a vehicle driving state from the detected vehicle driving information, and determines whether to satisfy a predetermined engine clutch engagement prohibition condition, generates and outputs a control command for prohibiting engine clutch engagement and maintaining an engine clutch in an open state, when it is determined that the predetermined engine clutch engagement prohibition condition is satisfied from the vehicle driving state, and controls to maintain the engine clutch in the open state that is a power cut-off state.

Therefore, an apparatus and method for controlling a hybrid electric vehicle according to the present disclosure is advantageous in that engine clutch engagement is prohibited when the vehicle creeps with a motor while an engine is on and the engine clutch is open, thus preemptively preventing the engine clutch engagement due to software or hardware errors, and a dangerous situation (such as impact when the vehicle is accelerated) due to errors as in the related art is prevented, thus improving vehicle stability.

BRIEF DESCRIPTION OF THE FIGURES

The above and other objectives, features, and other advantages of the present disclosure will be more clearly understood from the following detailed description when taken conjointly with the accompanying drawings, in which.

DETAILED DESCRIPTION

Figure 1:
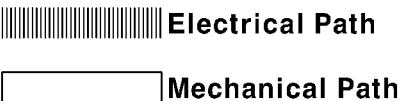
FIG. 1 is a diagram illustrating the configuration of a power train of a general hybrid electric vehicle.
Figure 1:
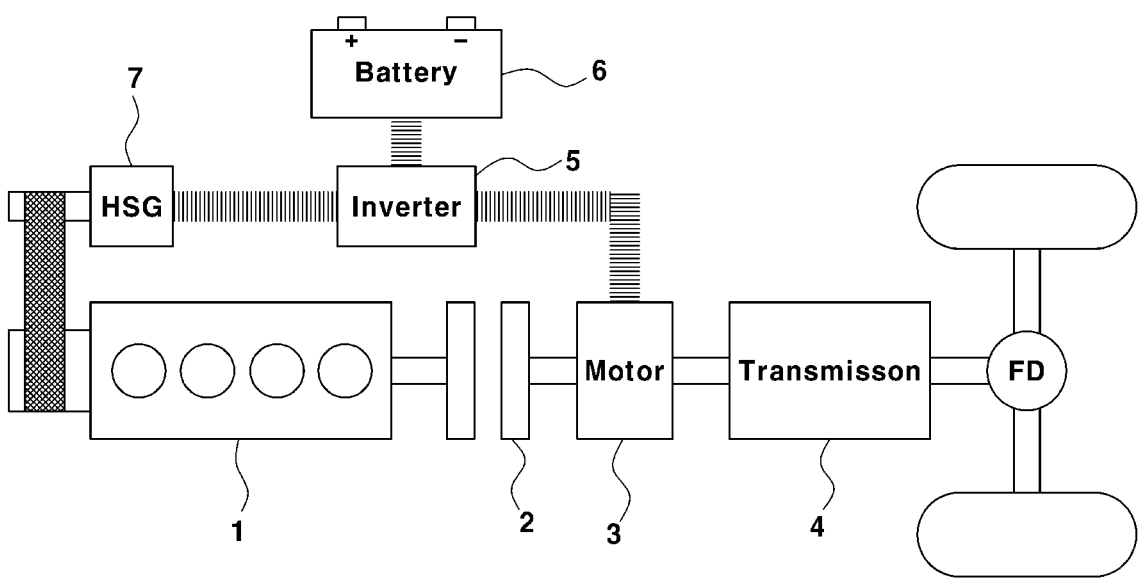
Figure 2:
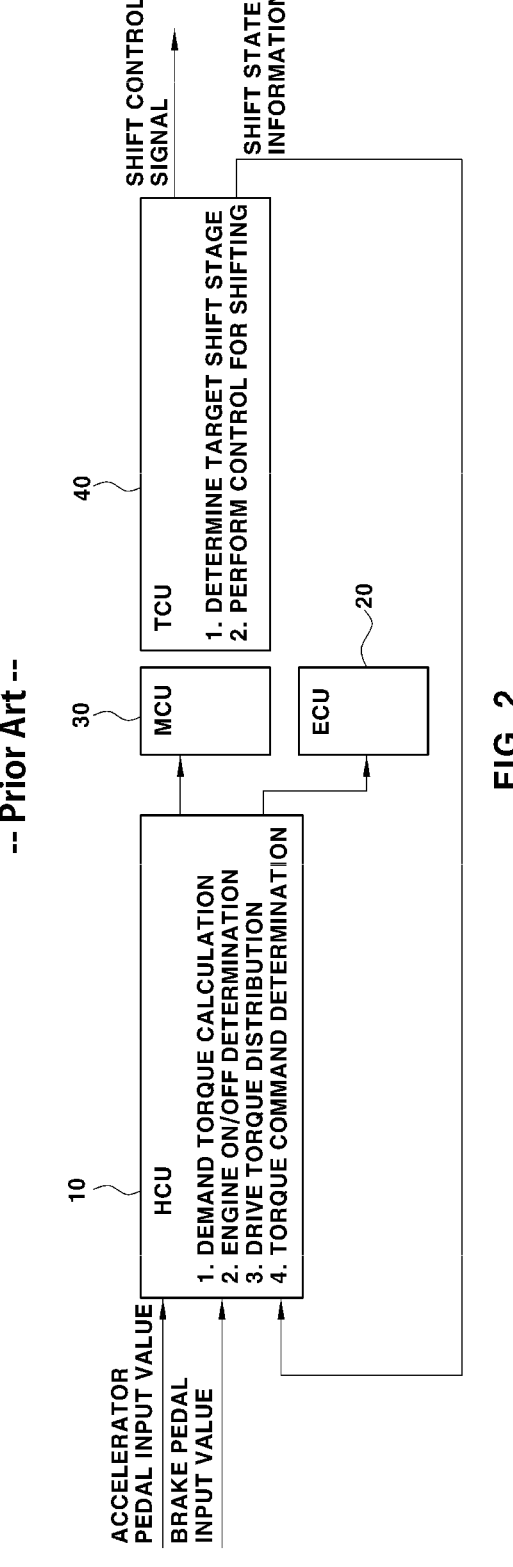
FIG. 2 is a block diagram illustrating the configuration of a control apparatus that performs power control and transmission control in the general hybrid electric vehicle.
Figure 3:
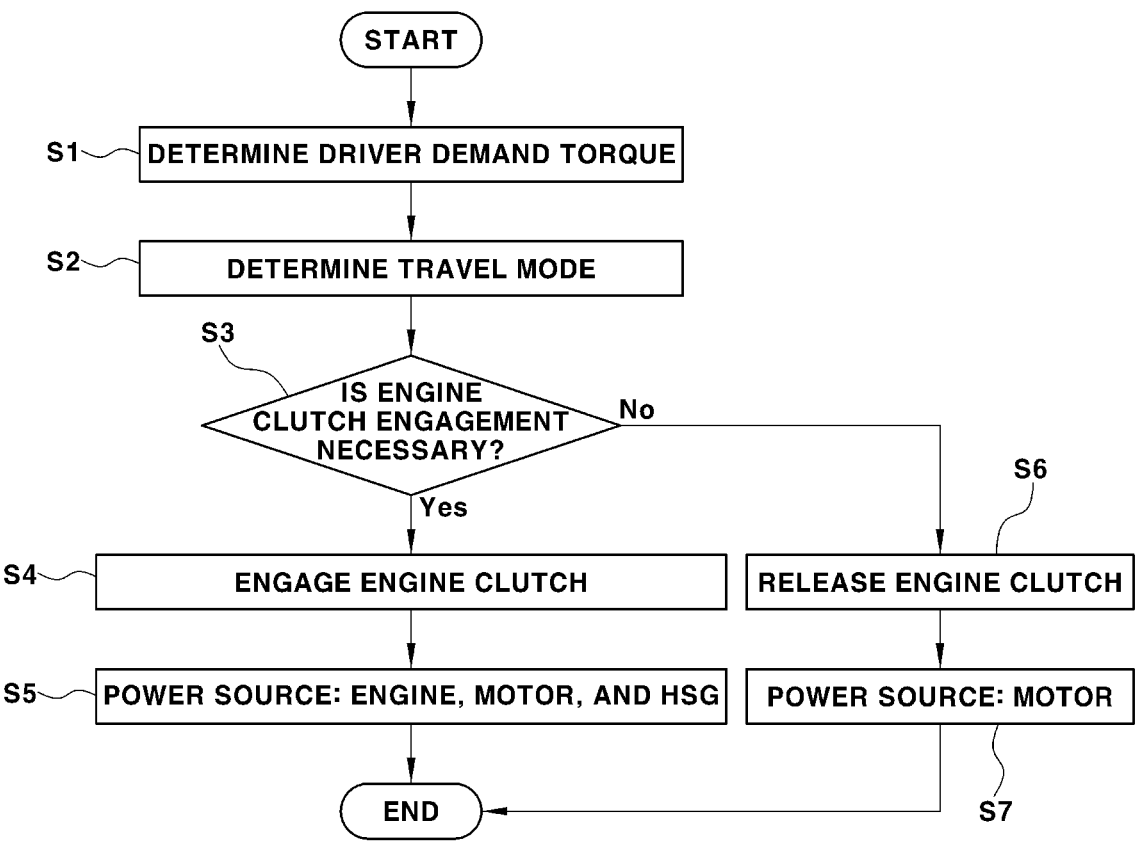
FIG. 3 is a flowchart showing the control process of a hybrid electric vehicle according to the related art.

Hereinafter, the embodiments of the present disclosure will be described in detail with reference to the accompanying drawings. Specific structural or functional descriptions in the embodiments of the present disclosure are only for description of the embodiments of the present disclosure. The present disclosure may, however, be embodied in many different forms and should not be construed as being limited to only the embodiments set forth herein, but should be construed as covering modifications, equivalents or alternatives falling within ideas and technical scopes of the present disclosure.

It will be understood that, although the terms "first", "second", etc. may be used herein to describe various elements, these elements should not be limited by these terms. These terms are only used to distinguish one element from another element. For example, without departing from the scope of rights according to the concept of the present disclosure, a first element may be referred to as a second element. Likewise, the second element may also be referred to as the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or directly adjacent to" should be construed in the same way.

The same reference numerals are used throughout the drawings to designate the same or similar components. The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

In the following description, reference is made to FIG. 1 for the configuration of the power train of the hybrid electric vehicle.

Figure 4:
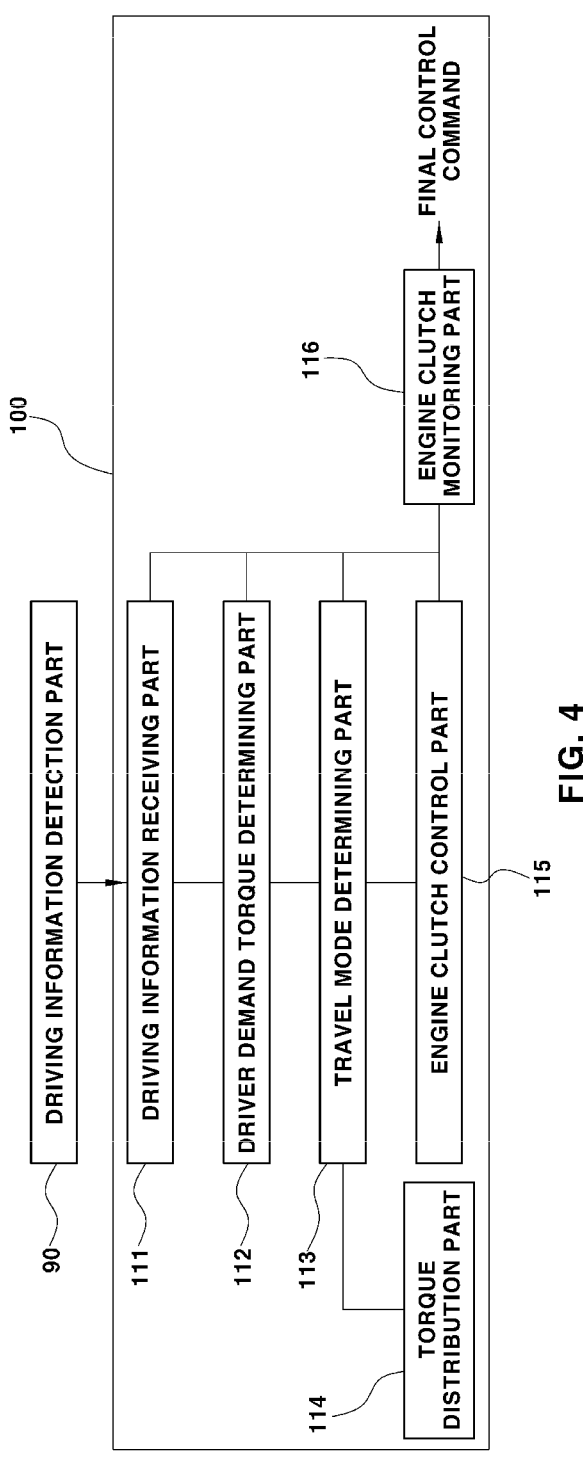
FIG. 4 is a diagram illustrating the configuration of a controller that performs a control process of a hybrid electric vehicle according to the present disclosure.

FIG. 4 is a diagram illustrating the configuration of a controller that performs a control process of a hybrid electric vehicle according to the present disclosure. As shown in the drawing, an engine clutch monitoring part 116 is added to the controller 100 to perform engine clutch engagement prohibition control logic.

Figure 5:
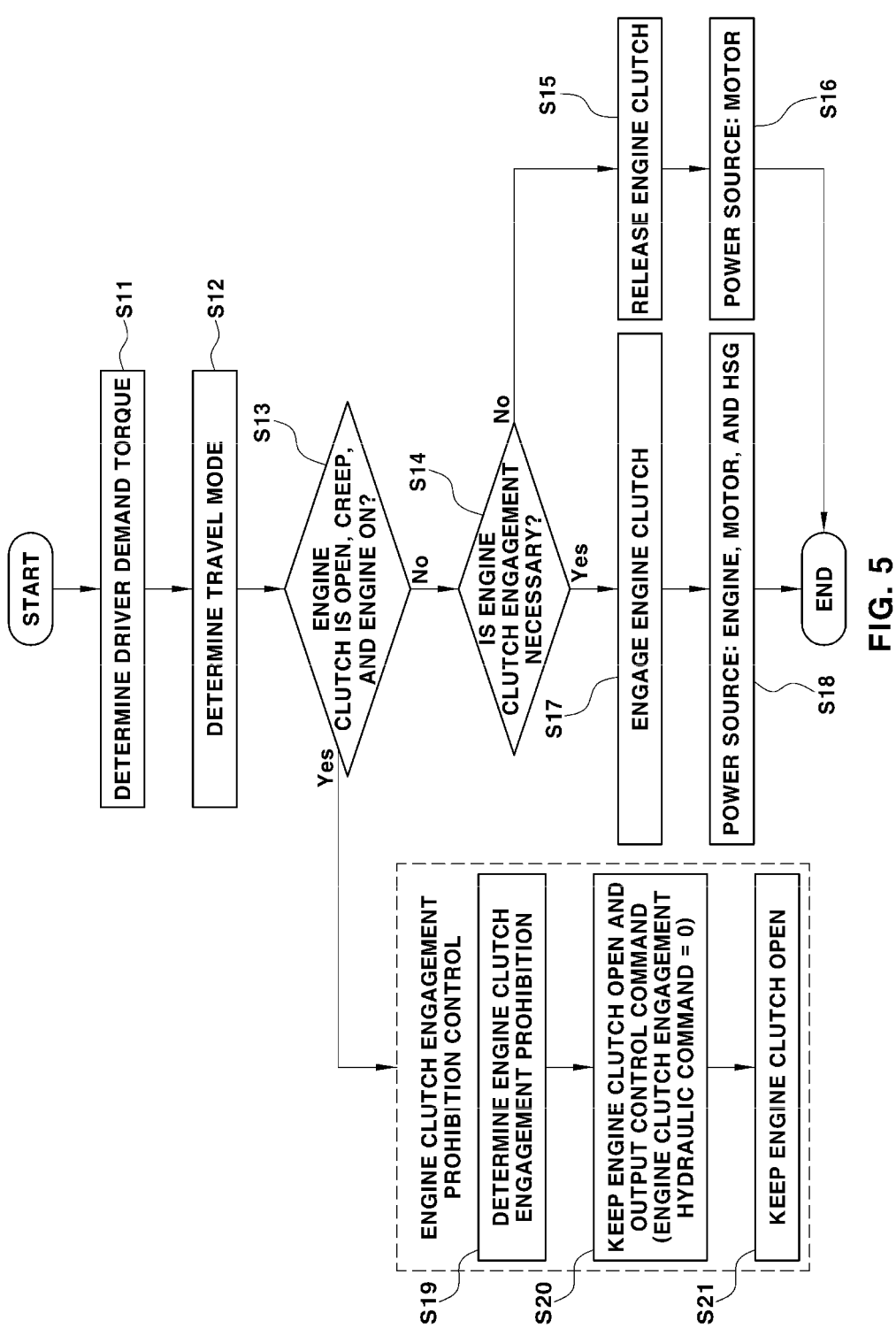
FIG. 5 is a flowchart showing the control process of the hybrid electric vehicle according to the present disclosure.

FIG. 5 is a flowchart showing the control process of the hybrid electric vehicle according to the present disclosure. This drawing shows the process of prohibiting engine clutch engagement along with the existing engine clutch control process of basic control logic.

A control apparatus of the hybrid electric vehicle according to the present disclosure includes a driving information detection part 90 that detects information indicating a vehicle driving state to perform the engine clutch engagement prohibition control logic, that is, vehicle driving information, and a controller 100 that performs the engine clutch engagement prohibition control logic on the basis of the vehicle driving information.

Here, the engine clutch engagement prohibition control logic is logic that monitors whether the vehicle driving state satisfies a predetermined engine clutch engagement prohibition condition and prohibits the engine clutch engagement when the engine clutch engagement prohibition condition is satisfied.

To this end, according to the present disclosure, the controller 100 further includes an engine clutch monitoring part 116 that monitors whether the vehicle driving state satisfies the predetermined engine clutch engagement prohibition condition and prohibits the engine clutch engagement when the engine clutch engagement prohibition condition is satisfied, in addition to a component that performs the basic control logic for determining the torque of each power source (engine, motor, HSG) and generating a command, and an engine clutch control part 115 that controls the operation of the engine clutch 2.

According to the present disclosure, even if the control command for the engine clutch engagement is generated and output from the engine clutch control part 115 when the engine clutch engagement prohibition condition is satisfied, the engine clutch monitoring part 116 does not allow and prohibits the engine clutch engagement, and outputs a control command to keep the engine clutch open, as a final control command for the engine clutch 2.

In contrast, when the control command for the engine clutch engagement is generated and output from the engine clutch control part 115 in a state where the engine clutch engagement prohibition condition is not satisfied, the engine clutch monitoring part 116 normally allows the engine clutch engagement, outputs and delivers the control command for the engine clutch engagement as a final control command, thus enabling an actuator unit for the engine clutch engagement to be controlled.

According to the present disclosure, the controller 100 for controlling the hybrid electric vehicle may be an upper controller such as a hybrid controller (HCU) or a vehicle domain controller (VDCU). The controller serves to control the torque of a vehicle drive system according to a driver's request.

In the present disclosure, the controller 100 determines a torque value that is to be output by each power source so as to satisfy the driver demand torque, and generates and outputs a command for each power source to output the determined torque, that is, a torque command for each power source. To perform this, the controller 100 includes a driving information receiving part 111, a demand torque determining part 112, a travel mode determining part 113, and a torque distribution part 114.

The driving information receiving part 111 receives a signal (e.g. an APS signal, a BPS signal) from the driving information detection part 90, such as an accelerator position sensor (APS) and a brake pedal position sensor (BPS) (S11). The demand torque determining part 112 determines the driver demand torque on the basis of the vehicle driving information acquired from the received signal of the driving information detection part 90, that is, the vehicle driving information including a driver's driving input value, such as an accelerator pedal input value (APS value) or a brake pedal input value (BPS value) (S12).

In an embodiment of the present disclosure, the driving information receiving part 111 may further receive a vehicle speed signal, and the vehicle speed signal may be a signal from a wheel speed sensor in the driving information detection part 90. Since the acquisition of the vehicle speed information from the signal of the wheel speed sensor is well known to those skilled in the art, a detailed description thereof will be omitted.

The travel mode determining part 113 determines the travel mode (PT driving mode) of the vehicle on the basis of charging and discharging related information such as a charging and discharging strategy according to the state of the main battery 6 and the determined driver demand torque (S3). The torque distribution part 114 distributes the driver demand torque for each power source according to the determined travel mode, and finally determines command torque for each power source in which the intervention torque is reflected.

To this end, the torque distribution part 114 performs preset torque distribution logic. According to the torque distribution logic, the intervention torque is added to the torque for each power source distributed from the driver demand torque to determine a final command torque for each power source in which the intervention torque is reflected. Further, when the command torque for each power source is determined, the torque command for each power source is generated and output.

Further, components in the controller 100, for instance, the driving information receiving part 111, the demand torque determining part 112, the travel mode determining part 113, the torque distribution part 114, the engine clutch control part 115, and the engine clutch monitoring part 116 may be set to perform cooperative control for the drive system torque control, the engagement or disengagement of the engine clutch, and the prohibition of the engine clutch engagement while exchanging necessary signals and information with each other. Further, the upper controller may be set to perform cooperative control with other controllers, such as an engine controller or a motor controller.

For example, after the controller 100 receives the vehicle driving information through the driving information receiving part 111 in the process of performing the basic control logic, and determines the travel mode of the vehicle through the travel mode determining part 113, the engine clutch monitoring part 116 may be set to check the vehicle driving state and then determine whether to satisfy a predetermined engine clutch engagement prohibition condition from the vehicle driving state (S13).

Here, the vehicle driving state includes an engine clutch state, a vehicle travel state, and an engine state. Further, the engine clutch engagement prohibition condition includes a condition in which the engine clutch is open, a condition in which the vehicle is creeping with the motor 3, and a condition in which the engine 1 is in an on state.

At this time, when all the three conditions are satisfied, in other words, the engine clutch is open, the vehicle is creeping with the motor 3, and the engine 1 is on, the engine clutch monitoring part 116 may determine to satisfy the engine clutch engagement prohibition condition.

In contrast, when it is determined that any one of the three conditions is not satisfied, the engine clutch monitoring part

116 may determine so that the engine clutch engagement prohibition condition is not satisfied.

In the engine clutch monitoring part 116, the state in which the vehicle is creeping with the motor 3 may be determined by selectively using the vehicle speed acquired through the sensor, a driver pedal input state, and a motor torque command.

For example, if the motor torque command is creep torque and the vehicle speed is occurring in the accelerator pedal off state and the brake pedal off state, it may be determined that the vehicle is creeping with the motor 3.

Here, the accelerator pedal off state and the brake pedal off state mean a non-operated state in which the corresponding pedal is not pressed by the driver. This may be determined from the signals of the accelerator position sensor and the brake pedal position sensor, which are received through the driving information receiving part 111.

Separately from the engine clutch monitoring part 116, the engine clutch control part 115 generates and outputs a control command to control the operating state of the engine clutch depending on whether it is necessary to currently engage the engine clutch. That is, when the travel mode determined by the travel mode determining part 113 is a HEV mode that requires the engagement of the engine clutch, the engine clutch control part 115 generates and outputs a control command for engaging the engine clutch (S14, S15).

At this time, the engine clutch monitoring part 116 may receive the control command for the engine clutch engagement from the engine clutch control part 115. Simultaneously, when it is determined that the engine clutch engagement prohibition condition is not satisfied from the vehicle driving state, the engine clutch engagement is permitted, and the control command for the engine clutch engagement is output as the final control command for the engine clutch, thereby allowing the engine clutch to be engaged through the actuator unit.

Further, the controller 100 controls the operation of the engine 1 and the motor 3, or the engine 1, the motor 3, and the HSG 7, which are the power sources, when the engine clutch is engaged, thereby causing the vehicle to be driven with the sum of the torques of the power sources. In the HEV mode, the vehicle is driven using the engine 1 and the motor 3, or the engine 1, the motor 3, and the HSG 7 as the power source (S16), and the operation of each power source is controlled according to the torque command for each power source that is finally generated and output by the torque distribution part 114.

Further, when the travel mode determined by the travel mode determining part 113 is the EV mode in which it is unnecessary to engage the engine clutch, the engine clutch control part 115 generates and outputs the control command for controlling the engine clutch 2 in a disengaged state (S14, S17).

At this time, the engine clutch monitoring part 116 receives the control command for controlling the engine clutch 2 in the disengaged state from the engine clutch control part 115, outputs it as a final control command, and controls the operation of the actuator unit according to the final control command, thereby allowing the engine clutch 2 to be disengaged.

The controller 100 controls the driving of the motor 3, which is the power source, in a state where the engine clutch is disengaged, thus allowing the vehicle to be driven only by the torque of the motor 3. The vehicle is driven using only the motor 3 as the power source (S18), and the driving of the motor 3 is controlled according to the motor torque command that is generated and output to satisfy the driver demand torque.

Further, when the engine clutch monitoring part 116 determines that the engine clutch engagement prohibition condition is satisfied, it determines to prohibit the engine clutch engagement (S19). Subsequently, even if the control command for engaging the engine clutch is received from the engine clutch control part 115, the control command for prohibiting the engagement of the engine clutch 2, that is, the control command for keeping the engine clutch in an open state is generated and output (S20).

At this time, the engine clutch monitoring part 116 may generate and output a hydraulic command (e.g. engine clutch engagement hydraulic command=0) for keeping the engine clutch 2 open, as a final control command.

When the engine clutch monitoring part 116 generates and outputs the hydraulic command for keeping the engine clutch 2 open, the actuator unit and the engine clutch 2 may be maintained in the open state.

Since it is known to those skilled in the art that the operation of the actuator unit is controlled according to the hydraulic command (control command for the engine clutch) that is output from the controller 100, and the state of the engine clutch is controlled as the operation of the actuator unit is controlled, the detailed description of maintaining or controlling the operation of the actuator unit and the state of the engine clutch in the closed state or the open state will be omitted.

Figure 6:
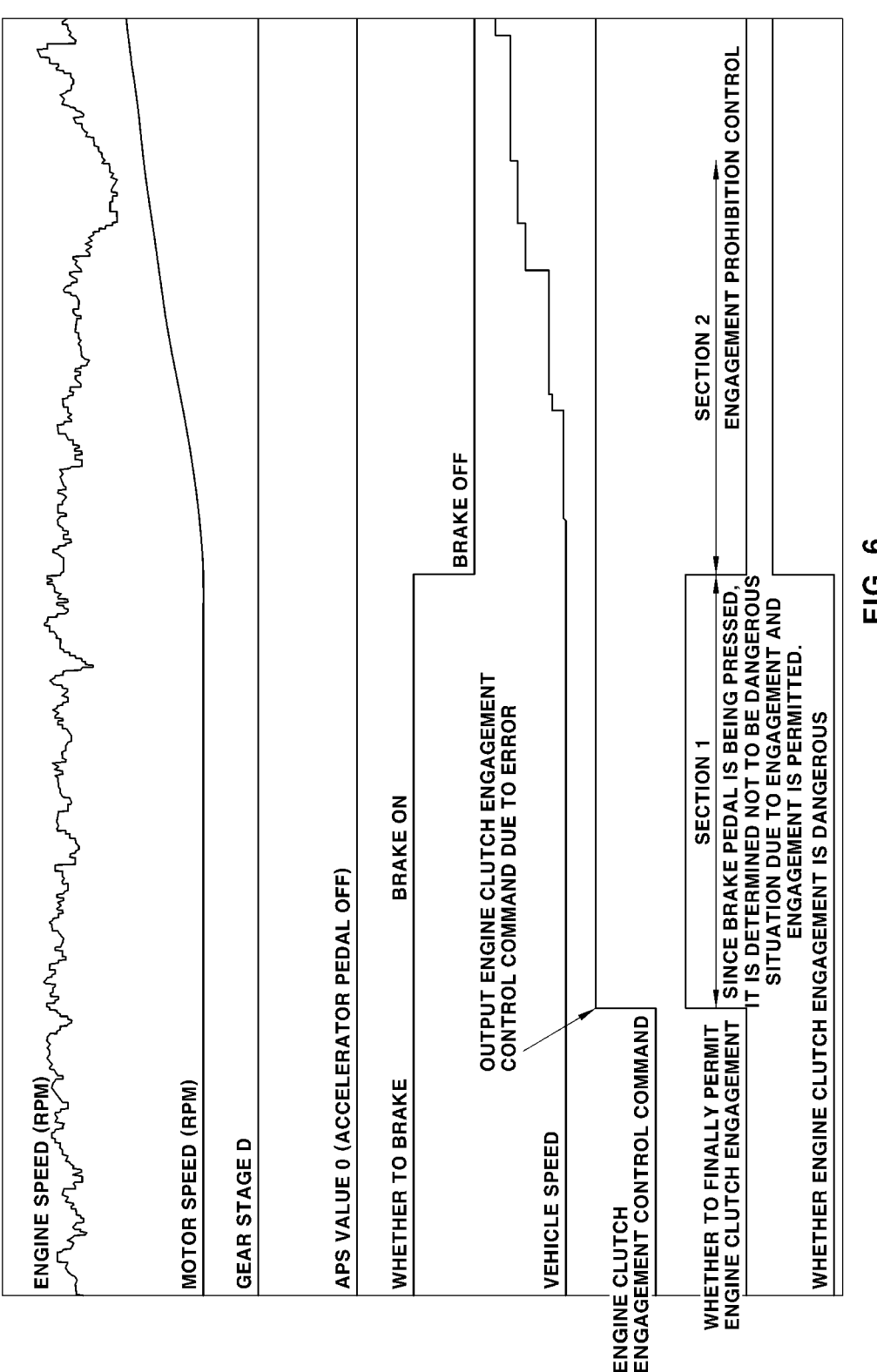
FIG. 6 is a diagram illustrating the control state of the hybrid electric vehicle according to the present disclosure.

FIG. 6 is a diagram illustrating the control state of the hybrid electric vehicle according to the present disclosure. This will be described as follows.

First, a graph located at the top of FIG. 6 represents an engine speed (RPM). A current graph shows that the engine 1 is on because the engine speed is generated. From the top, graphs show a motor speed (RPM), a gear stage, an accelerator pedal input value (APS value), the presence or absence of braking, and a vehicle speed, respectively.

In the example of FIG. 6, the gear stage represents a D stage. Further, according to the graphs showing the motor speed and the vehicle speed, the graphs shown gradual increase from a starting point of 'section 2' where the engine clutch engagement prohibition control is performed.

Particularly, according to the vehicle speed, during 'section 2', even if the control command for the engine clutch engagement is generated and output due to an error from the engine clutch control part 115, the engine clutch engagement prohibition control is performed, so the engine clutch engagement is not permitted, and thereby it can be seen that there is no unintended acceleration of the vehicle.

In the example of FIG. 6, it can be seen that a driver continues to keep the accelerator pedal off because the accelerator pedal input value (APS value) is 0. The accelerator pedal on means a state in which the driver presses and operates the accelerator pedal, and the accelerator pedal off means a state in which the driver does not press the accelerator pedal (non-operated state).

The accelerator pedal input value may be acquired from the signal of the accelerator position sensor (APS), and the accelerator pedal off state may be determined from the accelerator pedal input value. In FIG. 6, the accelerator pedal input value of 0 means that the accelerator pedal is off.

Further, the presence or absence of braking indicates a brake on state in which the brake of the vehicle is operated, or a brake off state in which the brake of the vehicle is not operated. This may indicate the brake pedal on or the brake pedal off by the driver. The brake pedal on refers to a state where the driver presses and operates the brake pedal, while the brake pedal off refers to a non-operated state where the driver does not press the brake pedal.

Referring to FIG. 6, it can be seen that the driver keeps the brake pedal on until 'section 1' and then switches the brake pedal to the off state from 'section 2'. Whether to brake may be determined from the signal of the brake pedal position sensor BPS.

As seen from the graph of FIG. 6, when the accelerator pedal is in the off state and the brake pedal also becomes in the off state, the vehicle creeps due to the motor torque. At this time, both the motor speed and the vehicle speed are generated.

Further, referring to the graph of FIG. 6, after a starting point of 'section 1', the control command for engaging the engine clutch ('engine clutch engagement control command') is generated and output from the engine clutch control part 115 in the state where the brake pedal is on due to the software or hardware error.

However, during 'section 1', the engine clutch monitoring part 116 does not output the control command for keeping the engine clutch open because the state is the brake pedal on state in which the driver presses the brake pedal and the engine clutch engagement prohibition condition is not satisfied, and finally outputs the engine clutch engagement control command to permit the engine clutch engagement.

Since the state of 'section 1' is a state in which the driver presses the brake pedal, the vehicle is not in the creeping state using the motor 3, and thereby the engine clutch engagement prohibition condition is not satisfied.

According to the engine clutch engagement prohibition control logic performed in the engine clutch monitoring part 116, the driver is pressing the brake pedal when the brake pedal is on. Thus, even if the engine clutch engagement control command is unexpectedly output from the engine clutch control part 115 due to the software or hardware error, the engine clutch monitoring part 116 determines that this is not a dangerous situation due to the engine clutch engagement, thereby finally allowing the engine clutch engagement.

However, subsequently, as in 'section 2', when the vehicle is creeping with the motor 3 in a state where both the brake pedal and the accelerator pedal are off, the engine clutch is in an open state, and the engine is in an on state, the engine clutch engagement prohibition condition is satisfied, and the engine clutch monitoring part 116 outputs the control command to prohibit the engine clutch engagement, that is, the control command to maintain the engine clutch in the open state.

As such, during 'section 2', even if the engine clutch control part 115 generates and outputs the control command for the engine clutch engagement, the engine clutch engagement prohibition control is performed by the engine clutch monitoring part 116, so the engine clutch engagement is not permitted, and the engine clutch may be maintained in the open state.

According to the related art, even in 'section 2', the engine clutch may be engaged, so the engine torque may be added to the motor torque through the engine clutch and be applied to the vehicle drive system. At this time, since the driver does not press the brake pedal, unintended vehicle acceleration may occur.

In contrast, according to the present disclosure, the engine clutch monitoring part 116 is added, so the engine clutch engagement prohibition control may be performed by the engine clutch monitoring part 116 in 'section 2'. Since the engine clutch engagement is not permitted due to the engine clutch engagement prohibition control performed in 'section 2', no unintended vehicle acceleration occurs.

Although the present disclosure was described with reference to specific embodiments shown in the drawings, it is apparent to those skilled in the art that the present disclosure may be changed and modified in various ways without departing from the scope of the present disclosure, which is described in the following claims.

The invention claimed is:

1. A method of controlling a hybrid electric vehicle, the method comprising:
    checking, by a controller, a vehicle driving state and determining whether to satisfy a predetermined engine clutch engagement prohibition condition, wherein the engine clutch engagement prohibition condition includes a condition in which an engine clutch is in an open state, a condition in which the vehicle creeps with a motor, and a condition in which an engine is on;
    generating and outputting, by the controller, a control command for prohibiting engine clutch engagement and maintaining the engine clutch in the open state, when it is determined that the predetermined engine clutch engagement prohibition condition is satisfied from the vehicle driving state; and
    maintaining the engine clutch in the open state that is a power cut-off state, by the control command output from the controller.

2. The method of claim 1, wherein the vehicle driving state comprises an engine clutch state, a vehicle travel state, and an engine state.

3. The method of claim 1, wherein the controller determines that the engine clutch engagement prohibition condition is not satisfied, when a brake is on as the vehicle driving state.

4. The method of claim 1, wherein the controller generates and outputs a control command to prohibit the engine clutch engagement and maintain the engine clutch in the open state, when it is determined that the engine clutch engagement prohibition condition is satisfied when the control command for the engine clutch engagement is generated, in the generating and outputting the control command for maintaining the engine clutch in the open state.

5. The method of claim 1, further comprising:
    determining whether the engine clutch engagement is necessary from the determined travel mode of the vehicle, when a driver demand torque is determined and the travel mode of the vehicle is determined, by the controller;
    generating and outputting the control command to engage the engine clutch, by the controller, when it is determined that the engine clutch engagement is necessary; and controlling the engine clutch to be in a closed state by the control command for the engine clutch engagement output from the controller.

6. An apparatus for controlling a hybrid electric vehicle, the apparatus comprising:
    a driving information detection part configured to detect vehicle driving information; and
    a controller configured to perform engine clutch engagement prohibition control logic;
    wherein the controller is further configured to:
    check a vehicle driving state from the detected vehicle driving information, and determine whether to satisfy a predetermined engine clutch engagement prohibition condition, wherein the engine clutch engagement prohibition condition, as a condition for the vehicle driving state, includes a condition in which an engine clutch is in an open state, a condition in which the vehicle creeps with a motor, and a condition in which an engine is on;
    generate and output a control command for prohibiting engine clutch engagement and maintain the engine clutch in the open state, when it is determined that the predetermined engine clutch engagement prohibition condition is satisfied from the vehicle driving state; and
    maintain the engine clutch in the open state which is a power cut-off state.

7. The apparatus of claim 6, wherein the vehicle driving state comprises an engine clutch state, a vehicle travel state, and an engine state.

8. The apparatus of claim 6, wherein the controller is further configured to determine that the engine clutch engagement prohibition condition is not satisfied, when a brake is on as the vehicle driving state.

9. The apparatus of claim 6, wherein the controller is further configured to generate and output a control command to prohibit the engine clutch engagement and to maintain the engine clutch in the open state, when it is determined that the engine clutch engagement prohibition condition is satisfied when the control command for the engine clutch engagement is generated.

10. The apparatus of claim 6, wherein the controller is further configured to:
    determine whether the engine clutch engagement is necessary from the determined travel mode of the vehicle, when a driver demand torque is determined and the travel mode of the vehicle is determined;
    generate and output the control command to engage the engine clutch, when it is determined that the engine clutch engagement is necessary; and
    control the engine clutch to be in a closed state by the control command for the engine clutch engagement output from the controller.

* * * * *